United States Patent [19]
Maruchi et al.

[11] Patent Number: 5,974,213
[45] Date of Patent: Oct. 26, 1999

[54] TRANSPARENT LIGHT GUIDE MEMBERS

[75] Inventors: Yoshihiro Maruchi; Eiichi Uematsu, both of Neyagawa, Japan

[73] Assignee: Matsushita Electric Works, Ltd., Osaka, Japan

[21] Appl. No.: 08/969,308

[22] Filed: Nov. 13, 1997

[30] Foreign Application Priority Data

Nov. 15, 1996 [JP] Japan .................................. 8-305103

[51] Int. Cl.⁶ .................................................. G02B 6/26
[52] U.S. Cl. ................................................................ 385/39
[58] Field of Search .............................. 385/31–42, 147, 385/45

[56] References Cited

U.S. PATENT DOCUMENTS

| | | | |
|---|---|---|---|
| 3,801,181 | 4/1974 | Kitano et al. | 359/652 |
| 4,345,818 | 8/1982 | Blum | 359/592 |
| 4,687,928 | 8/1987 | Thurston | 250/231.17 |
| 4,806,013 | 2/1989 | Bodenheimer et al. | 356/133 |

FOREIGN PATENT DOCUMENTS

| | | |
|---|---|---|
| 4-81101 | 7/1992 | Japan . |
| 7-230024 | 8/1995 | Japan . |
| 8-184713 | 7/1996 | Japan . |

OTHER PUBLICATIONS

An English LInguage Abstract of JP 4–81101. (No Date)
An English Language Abstract of JP 7–230024. (No Date)
An English Language Abstract of JP 8–184713. (No Date)
European Standard PrEN 50178, "Electronic Equipment for use in Power Installations", Oct.1996.
British (European) Standard EN 61131–2, "Programmable Controllers, Part 2: Equipment Requirements and Tests," Aug. 1994.

*Primary Examiner*—Akm E. Ullah
*Attorney, Agent, or Firm*—Greenblum & Bernstein, P.L.C.

[57] ABSTRACT

A light guide member for guiding a beam of light from a light emitting element, fixedly mounted on a printed circuit board, towards a display window defined in a casing that encloses the light emitting element and the printed circuit board therein. The light guide member includes a transparent rod having at least first and second reflecting surfaces defined therein at different locations along the length of the transparent rod. The transparent rod is designed to allow the beam of light to travel in three dimensions along the entire length of the transparent rod from a light receiving face, defined at one end of the transparent rod, to a light emitting face defined at the opposite end of the transparent rod.

8 Claims, 3 Drawing Sheets

TRANSPARENT LIGHT GUIDE MEMBERS

BACKGROUND OF THE INVENTION

1. Field of the Invention

The present invention generally relates to an optical light guide member and, more particularly, to the light guide member for guiding a beam of light from a light emitting element, fixedly mounted on a printed circuit board, towards a display window defined in a casing that encloses the light emitting element and the printed circuit board therein. The present invention also relates to an optical light guide assembly comprising a plurality of the optical light guide members connected together in a juxtaposed fashion.

2. Description of the Prior Art

It has long been well known that a transparent rod made of a transparent plastic material such as an acrylic resin can be used as an optical light guide for guiding a beam of light therethrough. Although incapable of being used in a long-distance light transmission such as accomplished by an optical glass fiber, the transparent rod is often used to guide a beam of light, emitted by a light emitting element such as, for example, a light emitting diode to any desired location.

By way of example, an electronic appliance such as a controller makes use of at least one light emitting diode as a status indicator to provide a visual indication of, for example, whether or not the electronic appliance is properly operated. Depending on the type of the electronic appliance and/or the type of the light emitting diode, the light emitting diode is often fixedly positioned on a printed circuit board and an indicator window is defined in a casing that encloses the printed circuit board therein. Where there is a substantial distance between the light emitting diode on the printed circuit board and the indicator window in the casing, the transparent light guide rod is generally employed for guiding a beam of light from the light emitting element to the indicator window so that a user or attendant worker can ascertain whether or not the light emitting diode is electrically energized, by looking at the indicator window.

The Japanese Laid-open Utility Model Publication No. 4-81101, published Jul. 15, 1992, discloses the use of a generally rectangular LED plate lens formed integrally with a plurality of generally cylindrical independent light guide bosses protruding outwardly from one surface of the LED plate lens. The LED plate lens is fixed to an inner surface of a lower front panel portion of a television receiver cabinet, where indicator windows are formed, so that respective free ends of the light guide bosses can be aligned with light emitting diodes that are fixedly mounted on a printed circuit board within the television receiver cabinet. This publication describes that each light guide boss may have a tubular shape and may be inclined so as to optically connect the respective light emitting diode with the associated indicator window where the indicator windows and the light emitting diodes are displaced in level relative to each other.

The Japanese Laid-open Patent Publication No. 7-230024, published Aug. 29, 1995, discloses, in one embodiment, a generally triangular light guide member made of a transparent plastic material and having first and second surfaces lying perpendicular to each other and a third surface lying at an angles relative to any one of the first and second surfaces. While the first and second surfaces of the light guide block are used as light receiving and emitting faces, respectively, the third surface is used as a reflecting surface for reflecting a beam of light, which has entered the light guide block through the light receiving face, towards the light emitting face.

This publication also discloses, in another embodiment, a monolithic light guide member made of a transparent plastic material and having first, second and third reflecting surfaces defined therein along the length thereof. The light guide member according to the alternative embodiment disclosed in this publication is so designed that a beam of light emitted from the light emitting diode and entering the light guide member through the light receiving face is, after having travelled along a first path, first reflected by the first reflecting surface so as to travel along a second path, then reflected by the second reflecting surface so as to travel towards the third reflecting surface along a third path in a direction substantially counter to the direction of travel of the beam towards the first reflecting surface, and finally reflected by the third reflecting surface so as to travel along a fourth path towards the indicator window in a direction substantially parallel to the direction of travel of the beam along the second path. The first to third paths defined in the light guide means lie in a single common plane substantially perpendicular to the printed circuit board.

The Japanese Laid-open Patent Publication No. 8-184713, published Jul. 16, 1996, discloses a monolithic light guide member of a generally L-shaped plate-like configuration made of a transparent plastic material and including long and short bodies angled relative to each other. The light guide member disclosed in this publication is used in a notebook-sized personal computer as a status indicator and is so designed and so configured that a beam of light emitted from a light emitting diode can be viewed from two directions generally perpendicular to each other regardless of whether a lid is closed or whether the lid is opened. For this purpose, the light guide member has, in addition to a single light receiving face aligned with the light emitting diode, first and second light emitting faces and is so designed that, regardless of the position of the lid, a beam of light from the light emitting element can travel directly towards the first light emitting face, but towards the second light emitting face after having been reflected by a series of four reflecting faces or can, alternatively, travel simultaneously towards the first and second light emitting faces after having been scattered by a roughened reflecting face.

According to any one of the foregoing publications, regardless of the number of reflections taking place in the light guide block or member, the beam of light travelling from the light receiving face towards the light emitting face or faces propagates in a single plane lying at an angle or right angles relative to the printed circuit board.

A certain encased electric appliance such as, for example, a sequence controller requires the use of a plurality of light emitting diodes to provide a visual indication of not only different operating statuses of the electric appliance, but also different line statuses of lines leading to and from the circuitry. Where the circuit design is given according to standards, for example, VDEO 160: 1988 (prEN50178: 1995) or EN61131-2: 1995, downscaling of the sequence controller is difficult to achieve because of a substantial distance found between the position of the light emitting diodes, mounted on the printed circuit board, and that of the indicator windows defined in a wall of the casing.

More specifically, the sequence controller includes relatively bulky electric component parts and relatively small electric component parts, both mounted on a printed circuit. The relatively bulky electric component parts include at least one modular pin connector having a row of a plurality of connector pins, a plurality of relay switches, and a transformer, all mounted on a primary circuit region (a high-voltage active region) of the printed circuit board whereas the relatively small electric component parts including the light emitting diodes are mounted on a secondary circuit region (a low-voltage active region) of the printed circuit board. The primary and secondary circuit regions are required to have a space of insulation of, for example, about 3 mm.

On the other hand, some or all of the indicator windows in the casing of the sequence controller discussed above must be coordinated with respective positions of the connector pins in the modular pin connector so that statuses of the lines associated with those connector pins can be visually displayed. This means that the primary circuit region in the printed circuit board must be positioned adjacent to the wall where the indicator windows are defined and the modular connector is installed and that the light emitting diodes included in the secondary circuit region have to be positioned in at least one row at a location distant from the indicator windows.

One possible solution to accomplishing the downscaling of the sequence controller would be the use of elongated light guide members one for each light emitting diode to convey a beam of light from the respective light emitting diode towards the associated indicator window. Each of these elongated light guide members may be of a design substantially similar to or identical with the light guide member disclosed in any one of the previous discussed publications.

However, as discussed hereinbefore, in the prior art light guide member or block referred to hereinbefore, the beam of light entering the light guide member or block travels only in one common plane at right angles to the printed circuit board. Accordingly, when the prior art light guide members are used in the sequence controller of the type discussed above, the light emitting diodes have to be positioned spaced a substantial distance from each other, thus limiting the extent to which the sequence controller can be downscaled.

The use of an optical glass fiber may be contemplated in place of the plastic light guide member. However, it has been found that where the space available between the printed circuit board and a panel of the casing is extremely limited, the optical glass fiber cannot be conveniently employed since it cannot be bent at right angles. Bending the optical glass fiber at right angles or an acute angle without allowing it to break upon bending requires a substantial radius of curvature and, hence, a relatively large space is required to accommodate the optical glass fiber, which in turn hampers the downscaling of the electronic appliance.

SUMMARY OF THE INVENTION

Therefore, the present invention has been devised to accomplish a further downscaling of the electronic appliance and is intended to provide an improved light guide member of a design capable of allowing a beam of light from a light emitting element to travel towards an indicator window along at least three optical paths defined in three dimensions.

The present invention is also intended to provide an improved light guide assembly of a generally rake-shape including a plurality of the light guide members each being of a design capable of allowing a beam of light from a light emitting element to travel towards an indicator window along at least three optical paths defined in three dimensions, so that the light emitting elements can be positioned in a substantially closely crowded fashion.

In order to accomplish these and other objects of the present invention, there is provided, in accordance with one aspect of the present invention, a light guide member for guiding a beam of light from a light emitting element, fixedly mounted on a printed circuit board, towards a display window defined in a casing that encloses the light emitting element and the printed circuit board therein. The light guide member includes a transparent rod having at least first and second reflecting surfaces defined therein at different locations along the length of the transparent rod. The transparent rod is of one-piece molded structure including at least first to third rod segments each having first and second ends opposite to each other, wherein the light receiving and emitting faces are defined at the respective first and second ends of the first and third rod segments, the first and second ends of the second rod segment being continued with the respective second and first ends of the first and third rod segments, respectively.

The first and second rod segments are angled relative to each other so as to lie in a first common plane and, on the other hand, the second and third rod segments are angled relative to each other so as to lie in a second common plane which is at a predetermined angle to the first common plane, both of the first and second common planes being angled to a plane of the printed circuit board. The first reflecting surface is defined at a junction between the first and second rod segments while the second reflecting surface is defined at a junction between the second and third rod segments.

The transparent rod may be positioned above the printed circuit board with the light receiving and emitting faces aligned with the light emitting element and the display window, respectively, whereby the beam of light emitted from the light emitting element and entering the first rod segment through the light receiving face travels towards the first reflecting surface, then travels towards the second reflecting surface through the second rod segment after having been reflected by the first reflecting surface, and finally emerges outwardly from the light emitting face after having been reflected by the second reflecting face so as to travel through the third rod segment.

According to the present invention, since the light guide member has the three optical paths defined in three dimensions from the light receiving face to the light emitting face, the beam of light emitted by the light emitting element can be efficiently and effectively transmitted to the indicator window even though a substantial distance is present between the light emitting element and the indicator window with other bulky electric components intervening therebetween.

The light guide member of the structure described may be supported stationary in any suitable manner, for example, allowing the light emitting end of the transparent rod to be firmly received within the indicator window. However, the transparent rod may preferably have a perforated lug formed integrally therewith so as to protrude laterally outwardly therefrom. This perforated lug can be used to secure the light guide member to one of the printed circuit board and the casing so as to enegage a fastening element that is connected, or otherwise integrally formed, with such one of the printed circuit board and the casing.

The present invention also provided, in accordance with another aspect thereof, a light guide assembly which includes a plurality of juxtaposed transparent rods of the structure described above that are connected together in a juxtaposed, preferably generally rake-shaped, fashion by means of a connecting means. The use of the generally rake-shaped light guide assembly makes it possible to allow the plural light emitting elements to be disposed in a substantially closely crowded fashion in at least one row on the printed circuit board.

Preferably, the connecting means may be in the form of at least one transverse connecting bar including a plurality of transverse connecting segments each connecting the neighboring members of the transparent rods together.

If at least one of the transverse connecting segments is formed with an elastically deformable buffer of, for example, a generally U-shape, change in spacing between the neighboring transparent rods that are connected together by means of such at least one of the transverse connecting segments can advantageously be absorbed and, therefore, the spacing between the neighboring indicator windows may not be defined precisely.

Also, to secure the light guide assembly steadily to one of the printed circuit board and the casing, the transverse connecting bar may have perforated lugs formed at respective opposite ends thereof as to protrude laterally outwardly therefrom. These perforated lugs can be used to secure the light guide member to one of the printed circuit board and the casing so as to engage respective fastening elements rigid or integral with the printed circuit board or the casing.

BRIEF DESCRIPTION OF THE DRAWINGS

The present invention will become readily understood from the following description of a preferred embodiment thereof made with reference to the accompanying drawings, in which like parts are designated by like reference numeral and in which.

DETAILED DESCRIPTION OF THE EMBODIMENT

Figure 1:
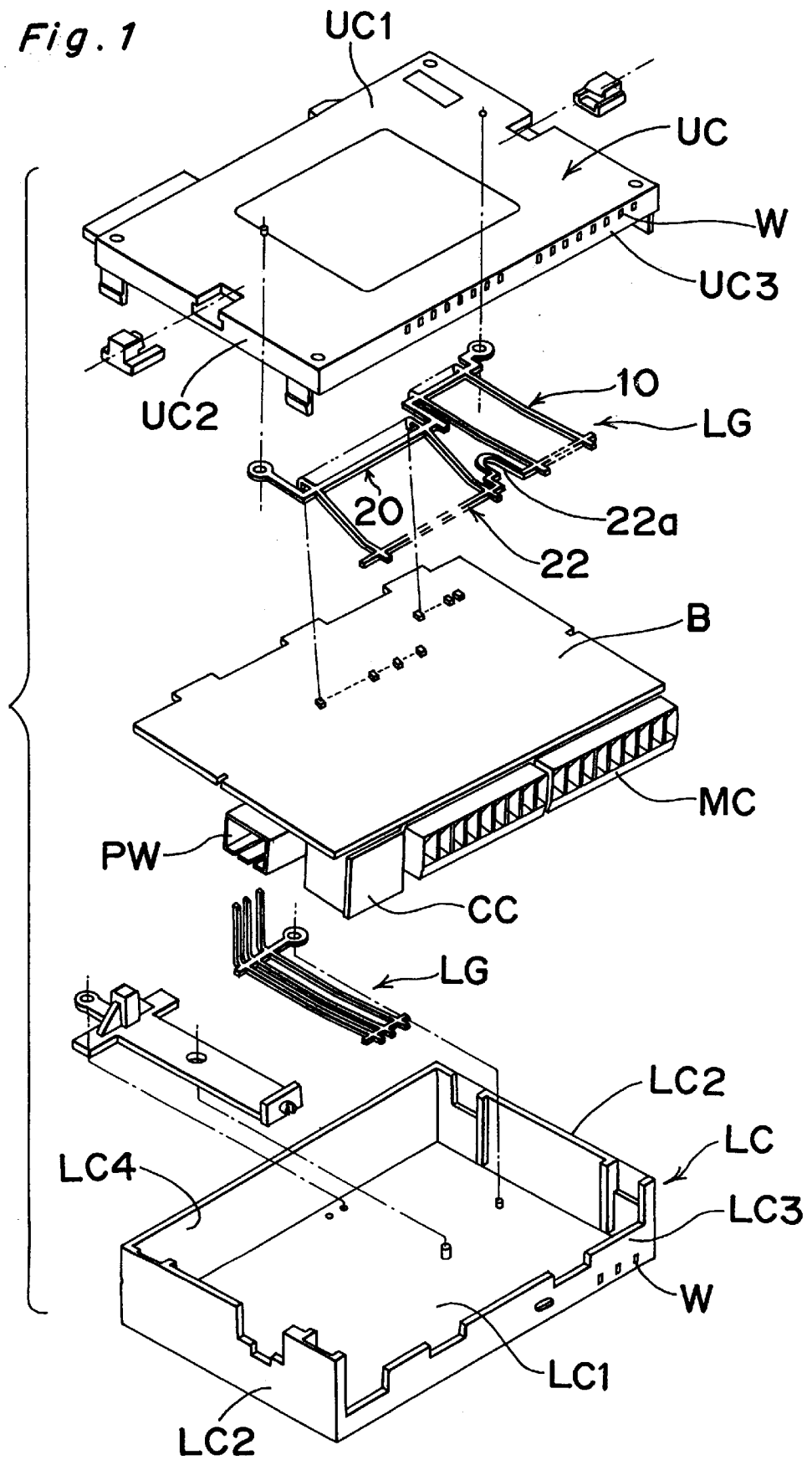
FIG. 1 is an exploded view of an illustrative sequence controller in which light guide assemblies according to the present invention are employed.

Referring first to FIG. 1, a sequence controller is shown for illustrative purpose to show the environment in which two light guide assemblies according to the present invention are employed. The sequence controller comprises a generally oblong printed circuit board B and a generally rectangular box-like casing of, for example, 9×6×2.5 cm in size made up of upper and lower casing halves UC and LC, the upper casing half UC being adapted to be capped onto the lower casing half LC with the printed circuit board B supported generally intermediate between the upper and lower casing halves UC and LC.

The upper casing half UC includes an oblong panel UC1, end wall segments UC2 (only one of which is shown), a rear wall segment (not visible) and a front wall UC3 and, likewise, the lower casing half LC includes an oblong panel LC1, end wall segments LC 2, a rear wall segment LC4 and a front wall segment LC3. Although not shown, both of the panels UC1 and LC1 may have a plurality of spacer projections formed therewith so as to protrude into the interior of the casing for the support of the printed circuit board B at a position about level with the plane of opening of, for example, the lower casing half LC. Instead of, or in combination with, the use of the spacer projections, respective free edges of the rear and side wall segments of one of the upper and lower casing halves UC and LC may be formed with respective shoulders contoured to receive mating peripheral edges of the printed circuit board P.

The printed circuit board B having a printed electric circuit printed on opposite surfaces thereof and includes, inter alia, at least one modular pin connector MC having a row of a plurality of connector pins (not visible), a cable connector CC and a power line connector PW. The modular pin connector MC is mounted fixedly on the undersurface of the printed circuit board B along a front edge portion thereof, with pin ends soldered to circuit conductors, so as to protrude partly outwardly from the periphery of the printed circuit board B. The cable connector CC is also mounted fixedly on the undersurface of the printed circuit board B at a location next to the modular pin connector MC and the power line connector PW is likewise fixedly mounted on the undersurface of the printed circuit board B along one of the opposite end edges of the printed circuit board B so as to protrude partly outwardly therefrom.

The printed circuit board B also includes first and second rows R1 and R1 of a plurality of light emitting elements, for example, light emitting diodes, fixedly mounted on an upper surface thereof in electrically connected relation with printed circuit conductors in any known manner and positioned on one side of the printed circuit board B remote from the modular pin connector MC with respect to the longitudinal axis thereof. Although not shown, a third row of similar light emitting diodes are also fixedly mounted on the undersurface of the printed circuit board B and similarly positioned on one side of the printed circuit board B remote from the modular pin connector MC. As will become clear from the subsequent description, the number of the light emitting diodes of the first row R1 is six, that of the light emitting diodes of the second row R2 is eight, and that of the light emitting diodes of the third row is three, although they may not be always limited to those specific values.

In any event, the sequence controller itself does not constitute subject matter of the present invention and no further details thereof are herein described for the sake of brevity. The present invention is rather directed to the light guide assembly for guiding beams of light emitter from the light emitting diodes to respective indicator windows W that are defined in the front wall segment of the upper casing UC in a row having been coordinated with some of the row of the connector pins in the modular connector.

Figure 2:
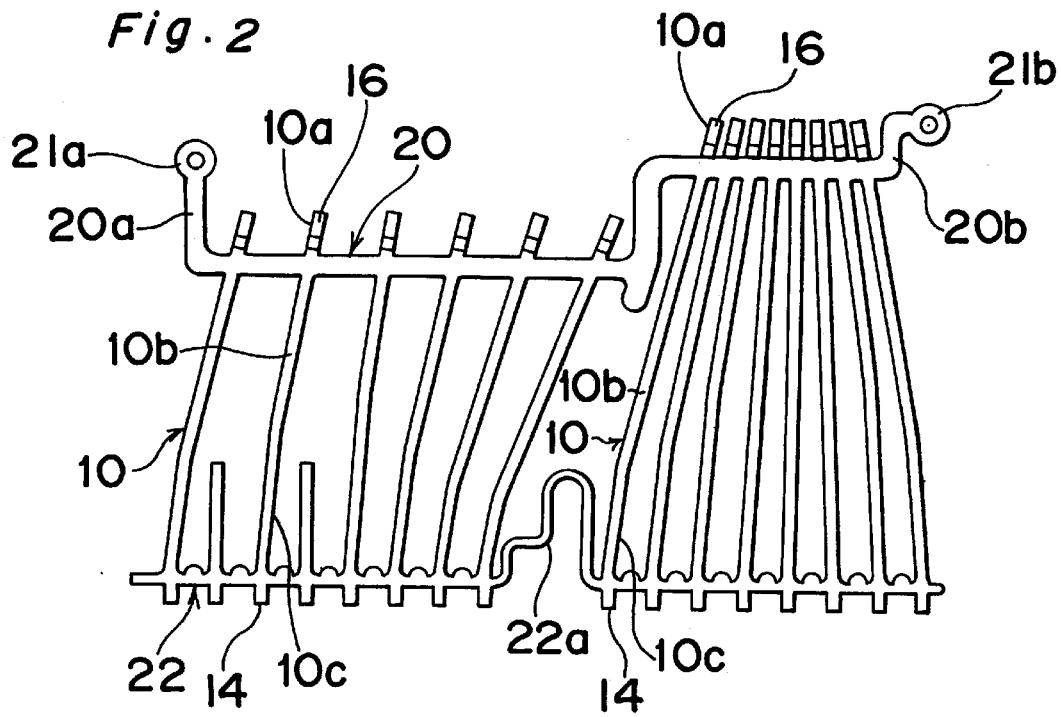
FIG. 2 is a top plan view, on an enlarged scale, of one of the light guide assemblies shown in FIG. 1.

With particular reference to FIG. 2, the light guide assembly LG for guiding beams of light from the light emitting diodes of the first and second rows R1 and R2 towards some of the indicator windows W is shown. The light guide assembly LG shown therein includes a plurality of juxtaposed transparent rods generally identified by 10. The light guide assembly LG can be formed of a transparent plastic material such as, for example, a transparent acrylic resin or a polycarbonate resin, by the use of any known plastic molding technique.

Figure 3:
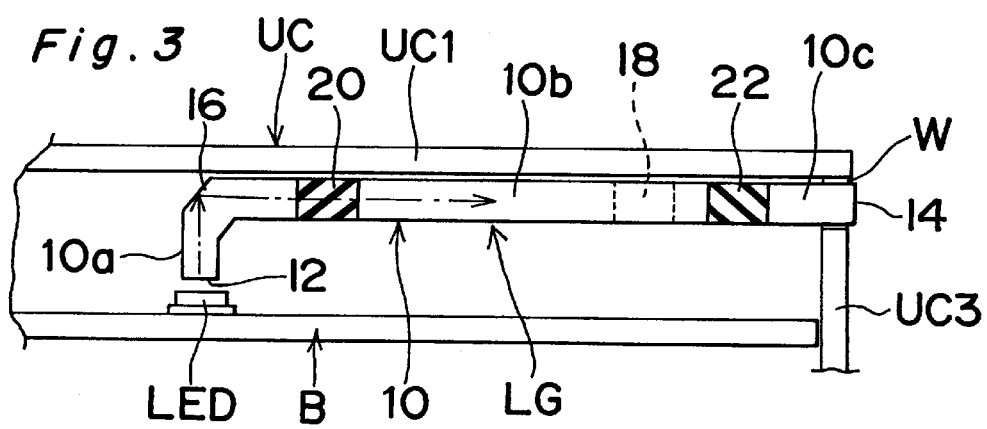
FIG. 3 is a transverse sectional view of an upper portion of the sequence controller, showing a disposition of the light guide assembly within the casing.

As best shown in FIGS. 2 and 3, each transparent rod 10 includes at least first to third rod segments 10a, 10b and 10c. The first rod segment 10a is continued to and extends at right angles to the second rod segment 10b which is in turn continued to and extends at an angle relative to the third rod segment 10c. While the first and second rod segments 10a and 10b lie in a first common plane, which in the illustrated embodiment as shown in FIG. 2 lies at right angles to the printed circuit board B, the second and third rod segments 10b and 10c lie in a second common plane which may be parallel to the printed circuit board B, but at an angle relative to the first common plane.

Figure 4:
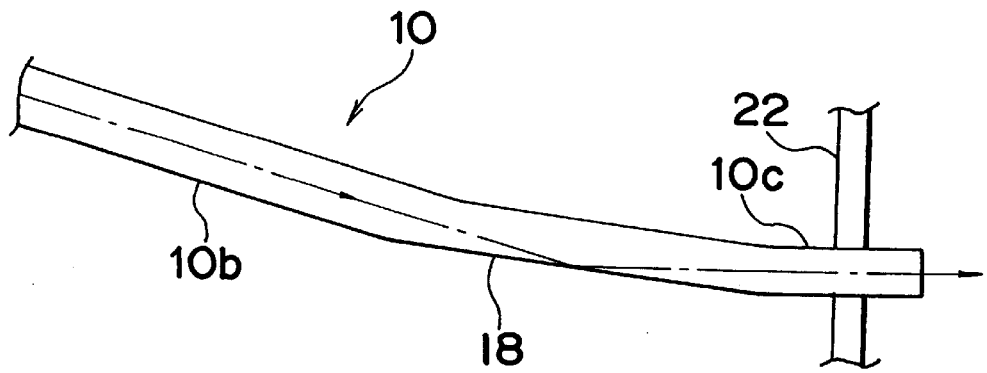
FIG. 4 is a fragmentary top plan view showing one of transparent light guide rods of the light guide assembly shown in FIG. 3.

Each transparent rod 10 has first and second opposite ends which serve as light receiving and emitting faces 12 and 14, respectively. Each transparent rod 10 also has at least first and second reflecting surfaces 16 and 18 for deflecting at two locations a beam of light that has entered the respective transparent rod 10 from the associated light emitting diode LED. Specifically, the first reflecting surface 16 is formed by bevelling an angled joint between the first and second rod segments 10a and 10b so that the beam of light traveling along a first optical path through the first rod segment 10a can be deflected 90° so as to travel along a second optical path through the second rod segment 10b as indicated by the arrow-headed phantom line in FIG. 3. On the other hand, the second reflecting surface 18 is formed by similarly bevelling an angled joint between the second and third rod segments 10b and 10c so that the beam of light travelling along the second optical path after having been deflected by the first reflecting surface 16 can be again deflected so as to travel along a third optical path through the third rod segment 10c towards the light emitting face 14 as shown by the arrow-headed phantom line in FIG. 4.

It is, however, to be noted that the plane containing the first and second optical paths is angled relative to the plane containing the second and third optical paths so that the beam of light emitted from the light emitting diode LED and entering the transparent rod 10 through the light receiving face 12 can travel in three dimensions along the entire length of the transparent rod 10 before it emerges outwardly from the light emitting face 14. This can be accomplished by positioning the first and second reflecting surfaces 16 and 16 at different planes angled relative to each other.

Each transparent rod 10 of the structure described above is so designed and so configured that a beam of light emitted from a corresponding one of the light emitting elements LED and entering the first rod segment 10a of the respective transparent rod 10 through the light receiving face 12 can travels straight towards the first reflecting surface 16, then travel towards the second reflecting surface 16 through the second rod segment 10b of such transparent rod 10 after having been reflected by the first reflecting surface 16, and finally emerge outwardly from the light emitting face 14 after having been reflected by the second reflecting face 18 so as to travel through the third rod segment 10c of such transparent rod 10.

By suitably selecting the refractive index of a material for each transparent rod 10 and the angle of inclination of each of the first and second reflecting surfaces 16 and 18 relative to the incoming beam of light, a total reflection can take place at each reflecting surface 16 and 18, which should be rather advantageous in minimizing a loss of light. Alternatively, each of the reflecting surfaces 16 and 17 in each transparent rod 10 may be mirror-finished, i.e., surface-treated to provide a mirror surface.

Under the environment of the sequence controller of the size mentioned previously by way of illustration, a space available between top of each light emitting diode LED and the upper panel UC1 of the casing, shown in FIG. 3, may be approximately 3 mm and the distance between the row R1 of the light emitting diodes LED and the front wall UC3 of the casing where the row of the indicator windows W are defined may be approximately 4 cm. It has been found that even the single transparent rod 10 can work satisfactorily and convey the beam of light efficiently from the associated light emitting diode LED towards the corresponding indicator window W.

As best shown in FIGS. 1 and 2, the transparent rods 10 are connected together in a juxtaposed fashion so as to lie in a common plane, specifically in the second common plane where the second and third rod segments 10b and 10c of each transparent rod 10 lie and which is also parallel to the printed circuit board B. Means for connecting the transparent rods 10 together in this manner may be at least one transverse connecting bar including a plurality of transverse connecting segments each connecting the neighboring members of the transparent rods 10 together. However, in the illustrated embodiment, two transverse connecting bars 20 and 22 are employed each including a plurality of transverse connecting segments and are integrally formed with the transparent rods 10 so as to extend in a direction conforming to the direction in which the transparent rods 10 are laid. Specifically, the transverse connecting bars 20 and 22 are positioned on the second and third rod segments 10b and 10c adjacent the first reflecting surface 16 and the light emitting faces 14, respectively, thereby completing the light guide assembly LG.

Each of the transverse connecting segments of the transverse connecting bar 20, except for two of the transverse connecting segments which are positioned laterally outside the light guide assembly as indicated by 20a and 20b is positioned intermediate between the neighboring members of the transparent rods 10 and adjacent the respective first reflecting surfaces 16. Similarly, each of the transverse connecting segments of the transverse connecting bar 22 is positioned intermediate between the neighboring members of the transparent rods 10 and adjacent the respective light emitting faces 14.

It is to be noted that the length of the transverse connecting bar 20 and the length of each connecting segments of the transverse connecting bar 20 may be suitably chosen depending on the spacing between the neighboring light emitting diodes LED of each rows R1 and R2, whereas the length of the transverse connecting bar 22 and the length of each connecting segments of the transverse connecting bar 22 may be suitably chosen depending on the spacing between the neighboring indicator windows W defined in the casing.

As best shown in FIG. 2, at least one of the transverse connecting segments of at least one of the transverse connecting bars 20 and 22, for example, the transverse connecting bar 22, that is positioned substantially intermediate of the length of the transverse connecting bar 22 is formed with a generally U-shaped buffer 22a recessed inwardly of the light guide assembly LG for absorbing a change in spacing between the neighboring transparent rods 10 that are connected together by means of such intermediate transverse connecting segment 22a. This U-shaped buffer 22a is elastically deformable to allow the spacing between the neighboring transparent rods 10 connected together by means of such intermediate transverse connecting segment 22a to be increased or decreased, so that the spacing between the neighboring indicator windows W may not be defined precisely. In the illustrated embodiment, the intermediate transverse connecting segment 22a is chosen to be the one dividing the transparent rods 10 into two groups associated respectively with the first and second rows R1 and R2 of the light emitting diodes LED. Instead of the U-shape, a generally V-shape or S-shape, or any other suitable shape sufficient to accomplish an elastically deformation to allow the spacing between the neighboring transparent rods 10, may be equally employed in the buffer 22a.

The transverse connecting segments 20a and 20b positioned laterally outside the light guide assembly are formed with respective perforated lugs 21a and 21b. These perforated lugs 21a and 21b can be used to secure the light guide member LG to one of the printed circuit board B and the casing so as to engage respective fastening elements (not shown) that may be connected, or formed integrally, with the printed circuit board B or the casing. It is, however, to be noted that the positions of the perforated lugs 21a and 21b may not be limited to those shown and described, but the perforated lugs may be integrally formed with the laterally outermost two of the transparent rods 10.

Figure 5:
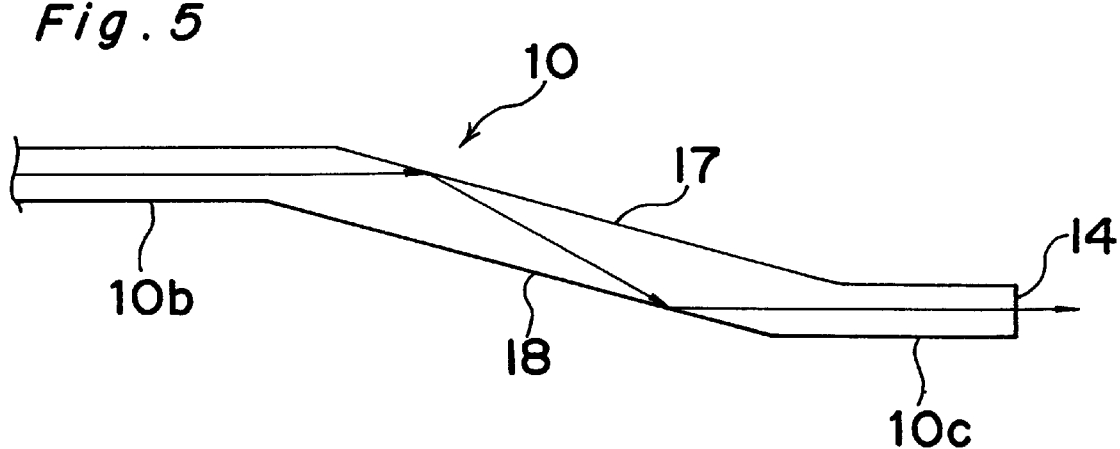
FIGS. 5 and 6 are views similar to FIG. 4, showing modified transparent light guide rods.

In the foregoing embodiment, the second reflecting surface 18 has been shown as formed on one side face of each transparent rod 10. This is satisfactory particularly where the angle of bend between the second and third rod segments 10b and 10c is relatively small. However, where the optical path along which the beam of light reflected by the first reflecting surface 16 is desired to be spaced a distance from the optical path along which the beam of light reflected by the second reflecting surface 18, the opposite side face of each transparent rod 10 may be formed with a third reflecting surface 17 as shown in FIG. 5.

Figure 6:
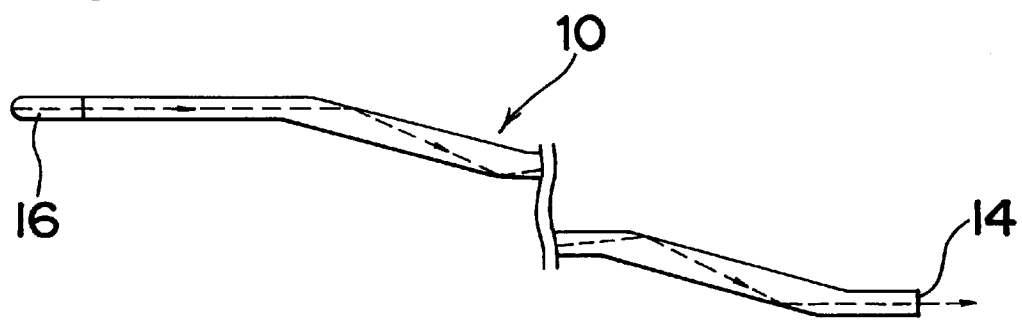

By a similar reason, each transparent rod 10 may have a plurality of opposing pairs of reflecting surfaces along the length as shown in FIG. 6 so that the beam of light reflected by the first reflecting surface 16 can be guided towards a point diverting a substantial distance laterally from the first reflecting surface 16.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A light guide member for guiding a beam of light from a light emitting element, fixedly mounted on a printed circuit board, towards a display window defined in a casing that encloses the light emitting element and the printed circuit board therein, said light guide member comprising:

a transparent rod having at least first and second reflecting surfaces defined therein;

said rod being of one-piece molded structure including at least first to third rod segments each having first and second ends opposite to each other, a light receiving face and a light emitting faces being defined at the respective first and second ends of the first and third rod segments, the first and second ends of the second rod segment being continued with the respective second and first ends of the first and third rod segments, respectively;

said first and second rod segments being angled relative to each other so as to lie in a first common plane, said second and third rod segments being angled relative to each other so as to lie in a second common plane which is at a predetermined angle to the first common plane, and said first reflecting surface being defined at a junction between the first and second rod segments and said second reflecting surface being defined at a junction between the second and third rod segments; and said transparent rod being positioned above the printed circuit board with the light receiving and emitting faces aligned with the light emitting element and the display window, respectively, whereby the beam of light emitted from the light emitting element and entering the first rod segment through the light receiving face travels towards the first reflecting surface, then travels towards the second reflecting surface through the second rod segment after having been reflected by the first reflecting surface, and finally emerges outwardly from the light emitting face after having been reflected by the second reflecting face so as to travel through the third rod segment.

2. The light guide member as claimed in claim 1, wherein said transparent rod has a fitting means formed integrally therewith so as to protrude laterally outwardly therefrom, said fitting means being used to secure the light guide member to a fastening element fitted to one of the printed circuit board and the casing.

3. The light guide member as claimed in claim 1, wherein said transparent rod is made of a light transmissive synthetic resin.

4. A light guide assembly which comprises:

a plurality of juxtaposed transparent rods each having at least first and second reflecting surfaces defined therein, each of said transparent rods being operable to guide a beam of light from a respective light emitting element, fixedly mounted on a printed circuit board, towards a corresponding display window defined in a casing that encloses the light emitting elements and the printed circuit board therein;

each of said transparent rods being of one-piece molded structure including at least first to third rod segments each having first and second ends opposite to each other, a light receiving face and a light emitting faces being defined at the respective first and second ends of the first and third rod segments, the first and second ends of the second rod segment being continued with the respective second and first ends of the first and third rod segments, respectively;

said first and second rod segments of each said transparent rod being angled relative to each other so as to lie in a first common plane, said second and third rod segments being angled relative to each other so as to lie in a second common plane which is at a predetermined angle to the first common plane, and said first reflecting surface in each said transparent rod being defined at a junction between the first and second rod segments and said second reflecting surface in each said transparent rod being defined at a junction between the second and third rod segments;

said transparent rods being positioned above the printed circuit board with the light receiving and emitting faces aligned with the light emitting elements and the display windows, respectively, whereby the beam of light emitted from one of the light emitting elements and entering the first rod segment of the associated transparent rod through the light receiving face travels towards the first reflecting surface, then travels towards the second reflecting surface through the second rod segment of such associated transparent rod after having been reflected by the first reflecting surface, and finally emerges outwardly from the light emitting face after having been reflected by the second reflecting face so as to travel through the third rod segment of such associated transparent rod; and means for connecting the transparent rods together in a juxtaposed fashion.

5. The light guide assembly as claimed in claim 4, wherein said connecting means comprises at least one transverse connecting bar including a plurality of transverse connecting segments each connecting the neighboring members of the transparent rods together.

6. The light guide assembly as claimed in claim 5, wherein at least one of the transverse connecting segments is formed with a deformable means for absorbing a change in spacing between the neighboring transparent rods that are connected together by means of said at least one of the transverse connecting segments.

7. The light guide assembly as claimed in claim 5, wherein said transverse connecting bar has fitting means formed at respective opposite ends thereof as to protrude laterally outwardly therefrom, each said fitting means being used to secure the light guide member to a fastening element fitted to one of the printed circuit board and the casing.

8. The light guide member as claimed in claim 4, wherein said transparent rod is made of a light transmissive synthetic resin.

* * * * *